United States Patent [19]
Gray et al.

[11] Patent Number: 5,620,202
[45] Date of Patent: Apr. 15, 1997

[54] INTERFACE BETWEEN IMPACT SENSOR AND CONTROLLER FOR A SUPPLEMENTAL INFLATABLE RESTRAINT SYSTEM

[75] Inventors: Charles A. Gray, Noblesville; Sheri L. Patterson, Greentown; Douglas A. Nunan; Richard J. Ravas, Jr., both of Kokomo; Robert V. Krakora, Carmel, all of Ind.

[73] Assignee: Delco Electronics Corp., Kokomo, Ind.

[21] Appl. No.: 376,565

[22] Filed: Jan. 23, 1995

[51] Int. Cl.$^6$ .................................................. B60R 21/32
[52] U.S. Cl. ..................... 280/735; 280/730.2; 340/436
[58] Field of Search .................................. 280/735, 734, 280/730.2, 730.1, 728.1; 364/424.01, 424.05; 340/436, 438

[56] References Cited

U.S. PATENT DOCUMENTS

| | | | |
|---|---|---|---|
| 4,410,875 | 10/1983 | Spies et al. | 280/735 |
| 4,873,452 | 10/1989 | Morota et al. | 280/735 |
| 5,430,649 | 7/1995 | Cashler et al. | 280/735 |

*Primary Examiner*—Eric D. Culbreth
*Attorney, Agent, or Firm*—Mark A. Navarre

[57] ABSTRACT

A side impact sensor processes side acceleration signals and upon a crash event develops a deploy signal which comprises accurately timed pulses of preset duration including a single pulse wake up message and a multiple pulse deploy message. A single wire interface couples the deploy signal to a microprocessor in a central controller which manages deployment of side and frontal air bags and runs frontal impact algorithm. The pulse edges cause interrupts used to measure the pulse widths which are compared to stored values to verify the messages. A wake up pulse causes the microprocessor to give priority to an algorithm for processing the deploy message over the frontal algorithm and still service the frontal algorithm without degradation. Signal drivers in the side impact sensor impose sharp pulse edges for the deploy signal and sloping edges for other signals monitoring the state of health of the side sensor to reduce radiated emissions.

15 Claims, 6 Drawing Sheets

INTERFACE BETWEEN IMPACT SENSOR AND CONTROLLER FOR A SUPPLEMENTAL INFLATABLE RESTRAINT SYSTEM

FIELD OF THE INVENTION

This invention relates to a supplemental inflatable restraint (SIR) system for an automotive vehicle and particularly to such a system having both side and frontal sensors and air bags.

BACKGROUND OF THE INVENTION

Supplemental inflatable restraint (SIR) systems for automotive vehicles incorporate a squib which is fired upon detection of a crash condition to rapidly inflate one or more air bags for occupant protection. Frontal SIR systems are well known for protecting against frontal collisions, and side systems have been proposed for protection against side impacts. For the frontal systems, an accelerometer is used to sense the vehicle deceleration and a control circuit, generally a microprocessor, evaluates the accelerometer output to determine whether a bag mounted in the steering wheel or dashboard should be inflated. Typically, the determination to deploy a bag is made in two stages: first when the accelerometer output reaches a given threshold value an impending crash is identified and in response the deployment system is armed, and second, the accelerometer output is further analyzed to determine the severity of the impact and a deploy command is generated when a given severity level is reached. Side SIR systems employ an air bag and an accelerometer on each side of the vehicle for independent response to lateral impact, and the deployment decision is made in much the same way as for the frontal system.

An important difference between the frontal and side SIR systems is in the required time for response. Because of the distance between the front of a vehicle and the passenger compartment, there can be a significant time between frontal impact and the start of bag inflation; a side impact, on the other hand occurs close to the passenger compartment and bag inflation must begin in a much shorter time. Another difference is that while separate accelerometers are used for each system, some control and deployment circuitry can be shared to avoid the expense of duplication of hardware. In particular, the microprocessor of the frontal system processes the frontal accelerometer signals to generate a deploy command and also carries out the deployment. It also does some diagnostic functions and controls warning indicators.

It is proposed to utilize the control functions of the frontal microprocessor to service the side SIR system. In that case it is essential that communication between the side system and the frontal processor be extremely reliable and not subject to false deployment commands due to noise or other causes. It is also essential that the communication be effected at high speed and that the speed or efficiency of the frontal processing should not be significantly affected.

It is known to use 8 bit serial communication for linking electronic modules in vehicles. To accomplish the communication speed and robustness required in the SIR system, clock speeds in the megahertz range are required. Implementation of that technology would necessitate expensive data handling hardware at each side sensor and at the frontal processor.

SUMMARY OF THE INVENTION

It is therefore an object of the invention to reliably communicate between different SIR systems having a common control. Another object is to afford such communication at high speed. Still another object is to minimize cost of a robust high speed communication interface for related SIR systems in the same vehicle.

The invention is carried out by a single wire interface between a side impact sensing system and a frontal impact sensing system that communicates the following information: state of health of the side sensor (fault/no fault), awake up feature to inform the frontal system that the side sensor is discriminating a crash event, and a deploy command to inform the frontal system to deploy the side air bags. The interface is characterized by speed and robustness. The speed is required to begin air bag inflation from 5-15 msec from side impact. Robustness prevents noise due to wiring opens or shorts or electromagnetic interference from deploying the side air bags. This is accomplished by a high frequency, variable pulse width deploy signal. The interface provides the frontal sensing system with the maximum amount of information about the side sensing system at a very low cost, while insuring speed and robustness. The interface also minimizes radiated emissions, especially during normal standby operation.

Each side impact sensor includes an accelerometer and a microprocessor that discriminates side crash events, but does not control deployment of the side air bags. It sends a deploy signal and a state of health signal to the frontal system which controls deployment of all air bags, illuminates a telltale lamp in the event of a side impact sensor fault, and could also provide energy reserves for the side air bags. Data pulses are fed to the single wire interface by the side sensor which waveshapes the pulse edges for low rise and fall rates for state of health messages and module identifier messages, and changes to high rise and fall rates for wake up and deploy messages. This results in low radiated emissions during normal operation, yet yields crisp pulse edges during an impact situation. The sharp pulse edges make possible accurate measurement of pulse widths; pulse width measurements are the basis for recognition of a deploy signal. The deploy signal comprises a few short precise pulses of different predetermined widths. The sequence of a wake up pulse followed by the precisely timed deploy pulses is virtually impossible to be accidently produced by noise. The few short pulses are very rapidly transmitted to and discriminated by the frontal module to achieve the necessary speed.

The frontal sensor microprocessor has a separate input capture register connected to each side sensor interface wire. The register produces an interrupt for each received pulse. That microprocessor runs software for several functions such as diagnostics, frontal and side air bag deployment, and processing the frontal algorithm for discriminating a frontal crash event. The frontal microprocessor normally responds to each interrupt to run a side interrupt algorithm which monitors the state of health and detects wake up and deploy commands. The frontal algorithm is periodically called by a timed interrupt to service the frontal accelerometer output signal for diagnostics and frontal crash detection. Normally, the side interrupt would be delayed while the frontal algorithm is running to afford maximum efficiency of frontal crash detection. However, if a wake up signal is issued by the side sensor, the frontal sensor microprocessor is placed in a dual sensitivity mode which allows subsequent interrupts to briefly break into the frontal algorithm operation to run the side interrupt algorithm which identifies the side deploy signal. This gives priority to the side deploy signal processing while only slightly extending the processing time of the frontal algorithm.

BRIEF DESCRIPTION OF THE DRAWINGS

The above and other advantages of the invention will become more apparent from the following description taken in conjunction with the accompanying drawings wherein like references refer to like parts and wherein:

FIGS. 6–10 are flow charts representing programs for processing interface signals and managing deployment of air bags, according to the invention.

The flow chart of FIG. 6 is directed to the main microprocessor power up routine; the flow chart of FIGS. 7A and 7B are directed to a side air bag algorithm; the flow chart of FIG. 8 is directed to a compare routine of the main microprocessor; and the flow chart of FIG. 9 is directed to a reset and timeout routine of the main microprocessor.

FIG. 10 is a flow chart of the timed interrupt

DESCRIPTION OF THE INVENTION

Figure 1:
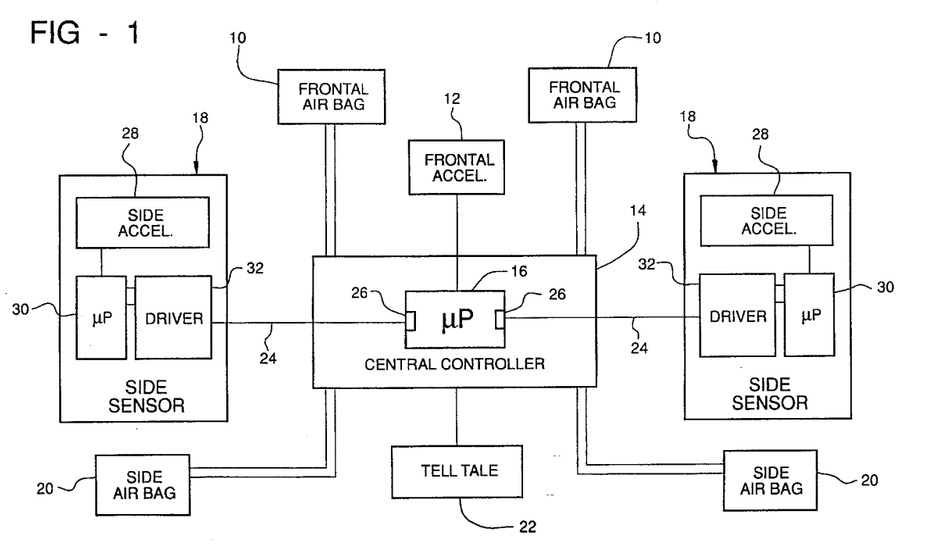
FIG. 1 is a block diagram of a SIR system with frontal and side sensors and air bags and interfaces according to the invention.

Referring to FIG. 1, a supplemental inflatable restraint (SIR) system includes frontal air bags 10, a frontal accelerometer 12 for sensing frontal impacts, a central controller 14 having a microprocessor 16 coupled to the accelerometer 12 to analyze the acceleration signal for a crash event to determine whether the front bags 10 should be deployed, a side sensor 18 and a side air bag 20 for each side of the vehicle, and telltale lamps or indicators 22 for signalling faults. Each side sensor is coupled by a single wire interface line 24 to the microprocessor 16 to transmit diagnostic information and deploy messages to the central controller 14, which in turn processes the messages, controls deployment of the side air bags 20, and manages fault indications via the telltale 22.

The microprocessor 16 is, for example, model 68HC11E9 manufactured by Motorola Semiconductor Products, Inc. Phoenix, Ariz., and has input capture registers 26 connected to the interface 24 lines. The registers 26 produce an interrupt for each received pulse and record the time of receipt of the last pulse. Each register 26 can be set by software switches to issue the interrupt on either the rising edge or the falling edge of a pulsed signal. This interrupt capability, along with the interface protocol to be described, avoids complex serial communication requirements.

Each side sensor 18 incorporates a side accelerometer 28 responsive to side impact, a microprocessor 30 for processing the accelerometer 28 signal to detect a crash event, and an output driver 32 for waveshaping output pulses which are carried by the interface line to the microprocessor 16. Each microprocessor 30 also issues state of health signals which would indicate normal functioning of each microprocessor 30 and the integrity of wiring connections. Still another signal carried over the interface from each microprocessor 30 is an identification signal which verifies that the correct side sensor is installed. A number of different sensors or differently calibrated sensors may be available to a vehicle assembler or service technician, and processing the identification signal will indicate when the wrong sensor is installed.

Figure 2:
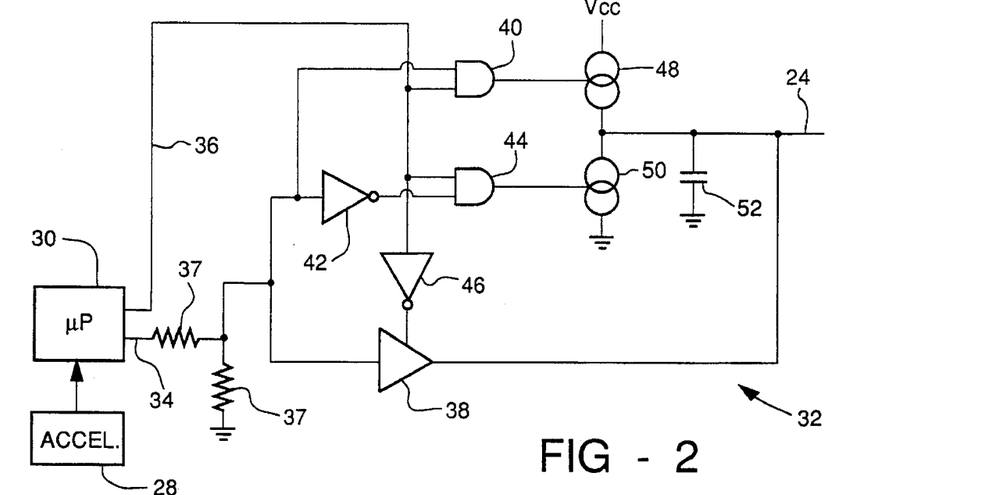
FIG. 2 is a schematic diagram of an interface driver and waveshaper for the system of FIG. 1, according to the invention.

FIG. 2 shows the side sensor output driver 32 in greater detail. The microprocessor 30 issues data pulses on line 34 and a mode signal on line 36. The mode signal is assigned a high state for sensor condition data which comprises identification or state of health messages, and a low state for deploy signals which comprise wake up and deploy messages. The data line 34 is coupled through a voltage divider comprising a pair of resistors 37 to a high current buffer 38, to an input of an AND gate 40, and through an inverter 42 to another AND gate 44. The mode line 36 is connected to inputs of each AND gate 40, 44, and through an inverter 46 to a control terminal of the buffer 38 for alternatively enabling the buffer or the AND gates. A first current source 48 controlled on and off by the output of AND gate 40 is connected between a 5 volt supply Vcc and interface line 24, a second current source 50 controlled by the output of AND gate 44 is connected between the line 24 and ground, and a capacitor 52 is connected across the current source 50. The current sources have a fixed current for charging or discharging the capacitor at a slow rate to define rise and fall rates of pulse edges which are sufficiently low to minimize or prevent radiated emissions.

In operation, when an identifier message or state of health message is being transmitted the mode line has a high voltage to enable the AND gates and turn off the buffer 38. The data pulses on line 34 alternately turn the AND gates on and off and likewise cause the current sources to turn on and off. When current source 48 is on the capacitor is charged to effect a rising edge of a transmitted pulse, and when the current source 50 is on the capacitor discharges through the source 50 to produce a falling pulse edge. Thus the data signal pulses on line 34 are replicated with slowly changing pulse edges for transmission to the central controller 16. When a wake up signal or deploy message is issued by the microprocessor 30, the mode line goes to a low voltage to disable the AND gates and the current sources, and to enable the high current buffer 38. The data pulses input to the buffer 38 result in high current so that the capacitor 52 charges or discharges quickly to create relatively sharp pulse edges for the transmitted signal. The current rating of the buffer 38 is, for example, ten times the rating of the current sources 48, 50, so that rise and fall rates of pulse edges are ten times greater when the buffer 38 is operative.

Figure 3:
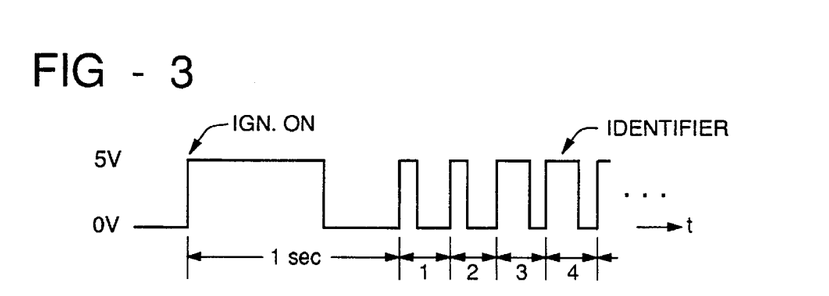
FIGS. 3–5 are waveform representations for interface signals for identifier, state of health, and deploy messages, respectively.
Figure 4:
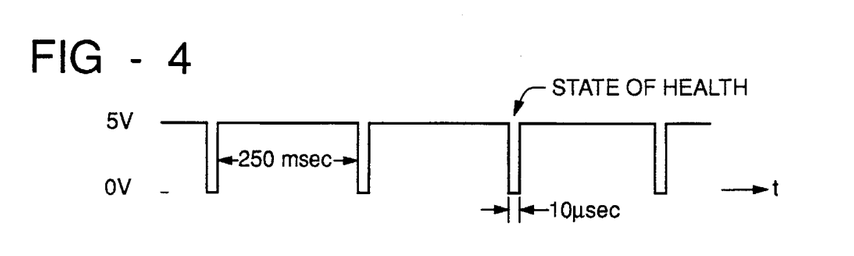
Figure 5:
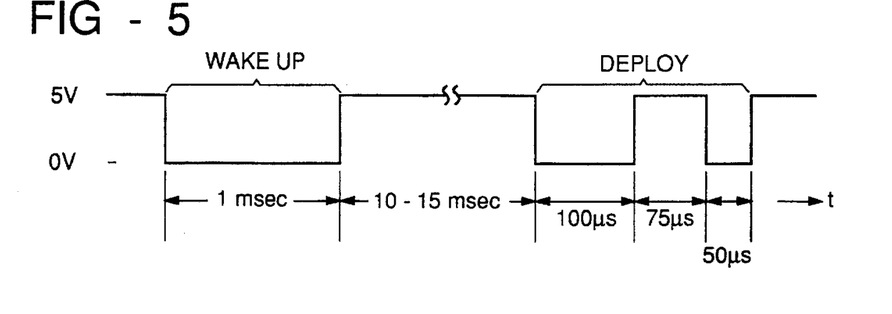

Pulse waveforms shown in FIGS. 3–5 are not drawn to scale since the disparity between msec and μsec ranges render proper scale impractical. Also the pulses are shown in square wave form for clarity, even though the edges are waveshaped as already discussed. It is assumed that the normal or idle state of the signal is high and pulses are usually low, but this convention may be reversed. In addition different pulse timing can be selected.

The sensor module identifier message is a pulse train depicted in FIG. 3 and is issued each time the vehicle ignition is turned on. At about one second after ignition is turned on a series of data bits representing a module code is transmitted. The bits each comprise a low and a high state having a high duty cycle of 33% for a logic 0 and 67% for a logic 1; each bit requiring about 1 msec. The drawing shows bits numbered 1–4, although 8 bits is a preferred message size. The microprocessor 16 matches this code to a stored code to verify a correct match.

The state of health message follows the identifier message and generally continues throughout vehicle operation unless an impact occurs. As shown in FIG. 4, the normal state of health message comprises a very short pulse, say 1, every 250 msec. The microprocessor 16 checks for the presence of such pulses and if the pulses are absent a fault signal is developed. If a fault in the side sensor 18 or a wiring fault caused a long-lasting high or low signal state, the short pulse would be absent to trigger the fault message. The state of health pulse is chosen to be very short to take advantage of a characteristic of the microprocessor 16. The input capture register is normally set to trigger an interrupt when a falling pulse edge is detected. The software responds to the interrupt by first checking for a low voltage at the input capture pin; however the inherent delay in processing the interrupt and then checking the pin voltage is greater than 10 μsec so that the short low pulse will never be detected, and it is correctly assumed that the low pulse occurred after the interrupt. If a low voltage occurs after an interrupt and lasts long enough to be detected, then it is not a state of health signal and is caused perhaps by noise or a wake up message.

When an impact occurs that is sufficient to register a high acceleration signal from the side accelerometer 28, a wake up message is issued. Such an impact may be considered as an impending crash, although further analysis of the continuing acceleration signal is necessary to determine the severity of the impact and to decide whether to issue a deploy command. Algorithms for such analysis and signalling are well known in SIR controls. The message protocol for signalling the wake up and deploy messages is depicted in FIG. 5. A wake up signal pulse of 1 msec is shown, although the duration is selected from a range of about 100 μsec to 2 msec. A long duration pulse is used to assure that the microprocessor 16 will detect it, even if it is processing a frontal algorithm which doesn't permit an immediate response to the interrupt. The effect of receiving a wake up signal is to sensitize the microprocessor 16 to ensuing interrupts to allow rapid recognition of a deploy message, even though the frontal algorithm is running. A timeout timer is set to start running at the beginning of the wake up signal and times out in 10 msec unless another valid pulse edge (e.g., the beginning of the deploy signal) occurs to reset the timer. The timer is checked only every 5 msec so the effective timeout may extend up to 15 msec. In the event of a timeout the system will be reset to again look for a wake up signal. Thus if the side sensor does not issue a deploy message after the wake up message, the timer will timeout.

If the side sensor issues a deploy message, it will consist of a few precisely timed pulses, and the side algorithm will measure the incoming pulses following the wake up message and verify that the pulses match a prescribed pattern. The pulses are alternately low and high state and are short to conserve time and preferably are of various pulse widths. The FIG. 5 example of the deploy message is a signal low state of 100 μsec duration immediately followed by a high state of 75 μsec duration immediately followed by a low state of 50 μsec duration.

Figure 6:
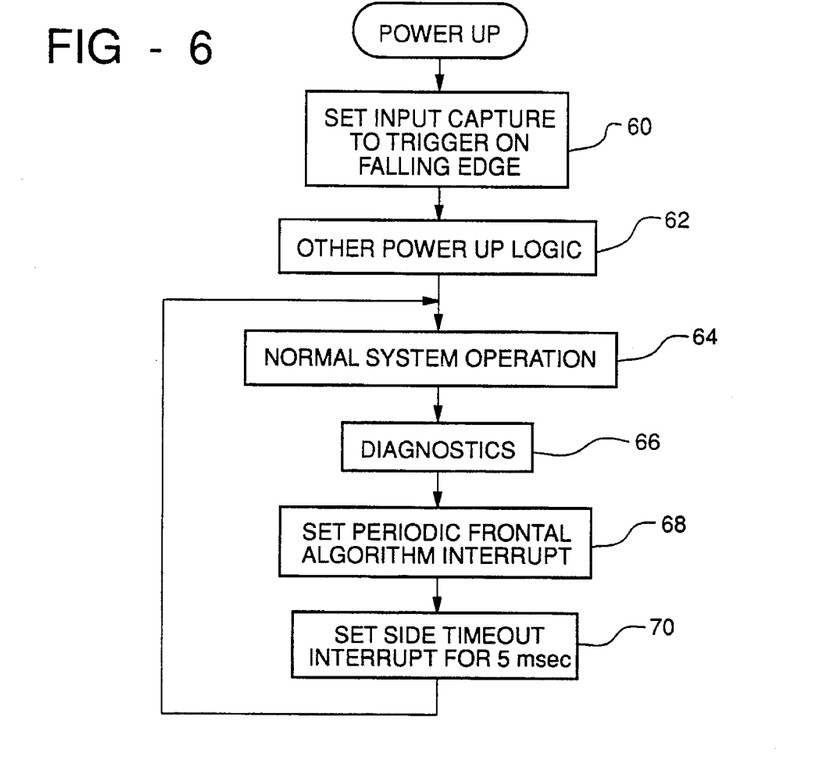
Figure 7A:
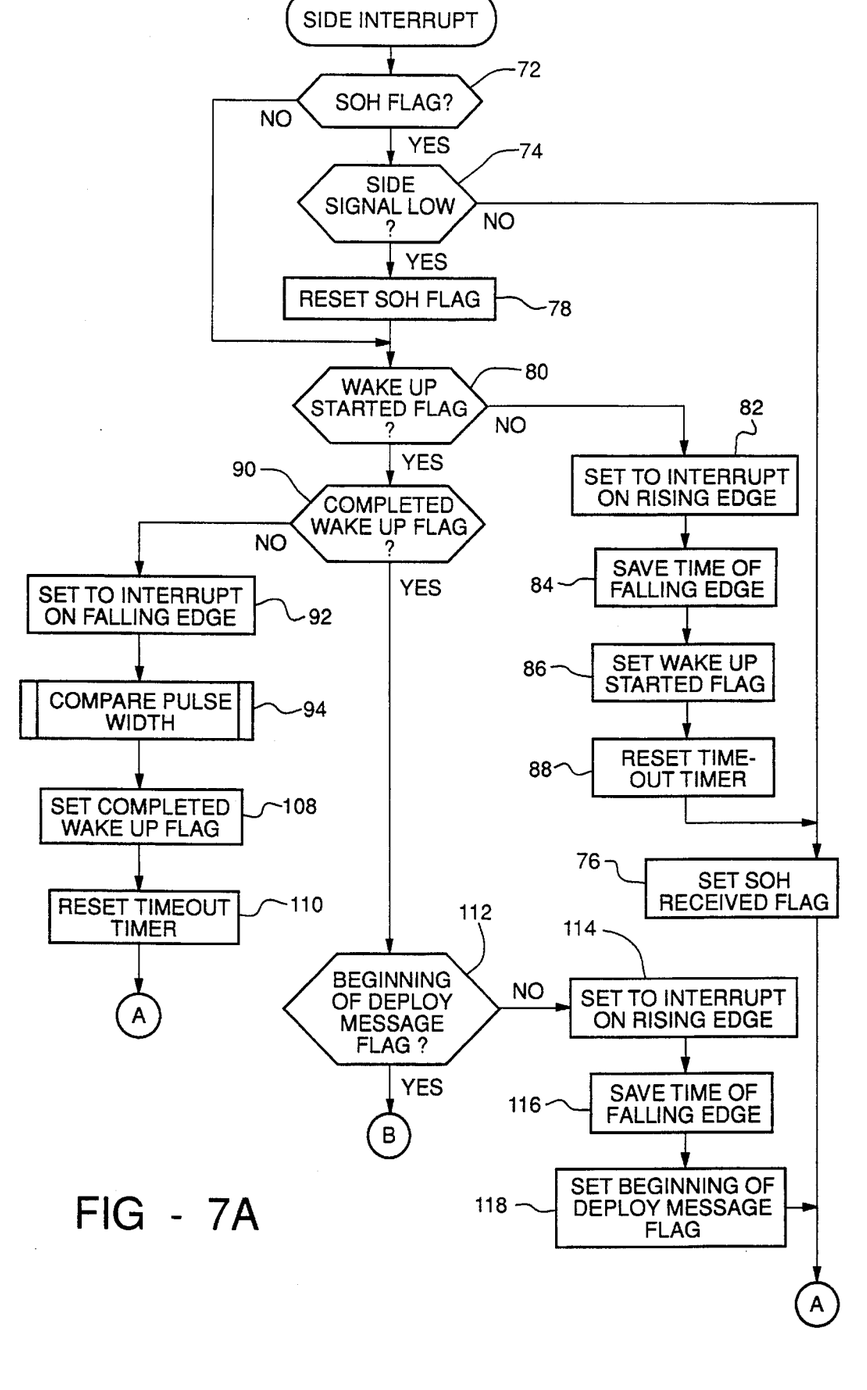
Figure 7B:
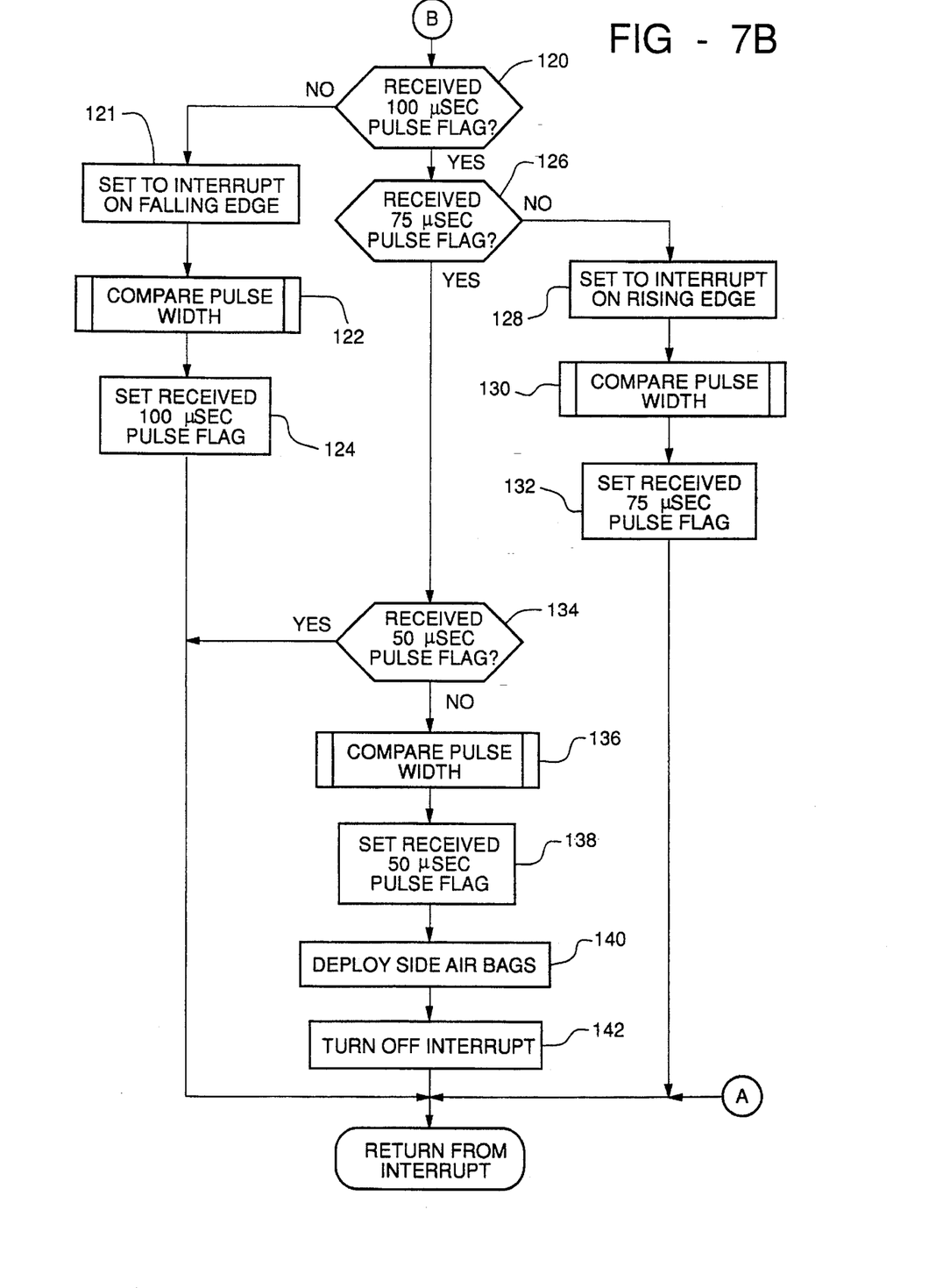

The ensuing FIGS. 6–10 show flow charts which generally represent the programmed microprocessor 16 operation. Numerals in angle brackets <nn> refer to functions described in boxes having the corresponding reference numerals. The power up routine of the microprocessor 16 is shown in FIG. 6. Upon power up the input capture register is set to trigger on the falling edge of the side signal <60>, other logic functions are performed <62>, and then normal operations commence <64> including diagnostic operations <66>, periodically servicing the frontal algorithm interrupt <68>, and servicing the side timeout interrupt every 5 msec <70>.

The side interrupt produced by the input capture register is generally serviced whenever it occurs, subject to a short delay (about 10 μsec) in processing the interrupt and calling the side algorithm. An exception is that when another interrupt is being processed, e.g., the frontal algorithm is running, other interrupts normally will not be honored. The side algorithm, shown in FIGS. 7a and 7b, then is called when the side interrupt is received. The state of health (SOH) Message flag is initialized as set, so that initially the SOH query <72> responds as yes and the side signal on the input capture pin is checked <74>. Normally the voltage will be high because the short SOH pulse will have passed due to the short delay. Then a SOH Received flag is set <76> and the side algorithm exits. If however the side signal is low when checked <74>, as occurs when a wake up pulse begins, the SOH Message flag is cleared <78> and a Wake Up Started flag is checked <80>; the flag is clear initially. Then the input capture is set up to trigger on the next rising edge <82> and the time of the falling edge interrupt is saved <84> as a first edge time so that the duration of the low signal can be measured. The term "edge time" as used herein thus refers to the recorded time of a pulse edge, whether rising or falling. The Wake Up Started flag is set <86> and a timeout timer is reset <88>. The SOH Received flag will also be set <76>; even though a SOH signal is not detected, the receipt of another valid pulse has the equivalent effect. The next interrupt will occur when the signal goes high. Normally this rising edge will occur at the end of the wake up pulse and the pulse length must be checked to verify that a wake up message has occurred. Now the SOH message is clear <72> and the Wake Up Start flag is recognized <80> and a Completed Wake Up flag is checked <90>. It has not yet been set so the input capture is set up to trigger on the next falling edge <92> and a compare routine is called to check the pulse width <94>.

Figure 8:
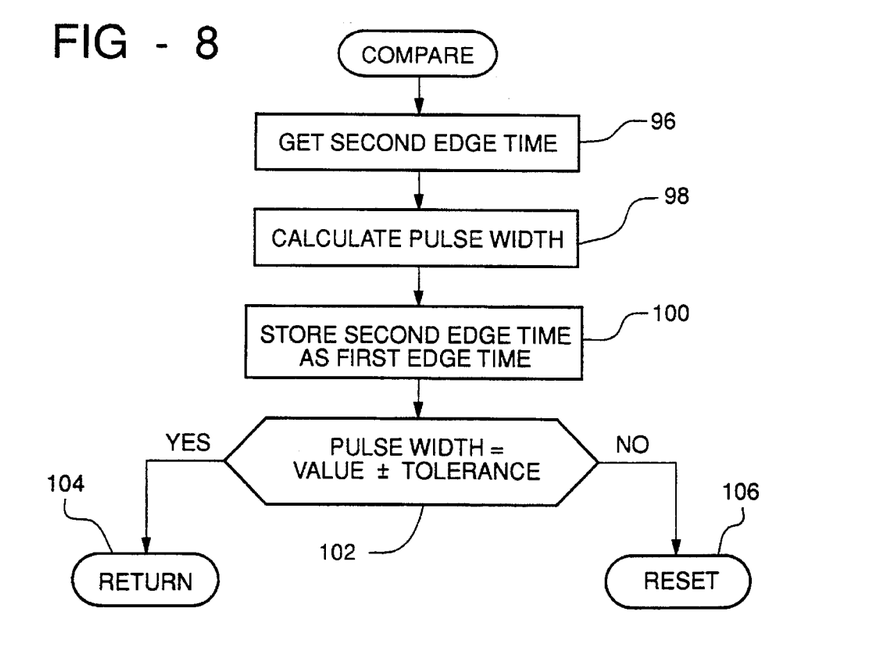

FIG. 8 shows the compare routine. The microprocessor memory stores a series of values and tolerances, or ranges, for the wake up pulse and the several deploy message pulses, and the appropriate value is retrieved according to the pulse currently being verified. Thus for the example given in FIG. 5, the values are 0.95 to 1.05 msec, 95 to 105 μsec, 70 to 80 μsec, and 45 to 55 μsec for the respective wake up pulse and the deploy message pulses. The time of the most recent interrupt or second edge is retrieved <96> and compared with the time of the first edge to calculate the pulse width <98>; then the second edge time is saved as the first edge time for the next pulse width measurement <100>. The calculated pulse width is compared with the stored value and tolerance, or range, for a wake up pulse <102>; if the measured pulse is verified the compare routine returns <104> and if it is not verified the side algorithm is reset <106>.

Returning to FIG. 7a, after the wake up message pulse is verified, a Completed Wake Up flag is set <108> and the timeout timer is again reset <110>. An interrupt on the next falling pulse finds that the Completed Wake Up flag has been set <90> and the system is waiting for the beginning of the deploy message <112>. Then the input capture is set up to trigger on the next rising edge <114>, the time of the receipt is stored <116> and a Beginning of Deploy Message flag is set <118>. The next interrupt finds that flag is set <112> and the receipt of the 100 μsec pulse has not yet been verified <120>. Then the input capture is set up to trigger on the next falling edge <121>, the compare routine is called <122>, and if the pulse time is verified a Received 100 μsec Pulse flag is set <124>. The next program loop passed the decision at block 120 and since the 75 μsec pulse has not been verified <126> the input capture is set for a rising edge <128>, the compare routine is called <130> and if the proper width pulse is received a Received 75 μsec Pulse flag is set <132>. Finally, at the next interrupt since the Received 50 μsec Pulse flag has not been set <134>, the compare routine is called <136>, and if the proper width pulse is received a Received 50 μsec Pulse flag is set <138>, a command is issued to deploy a side air bag <140> and the interrupt is turned off <142>.

Figure 9:
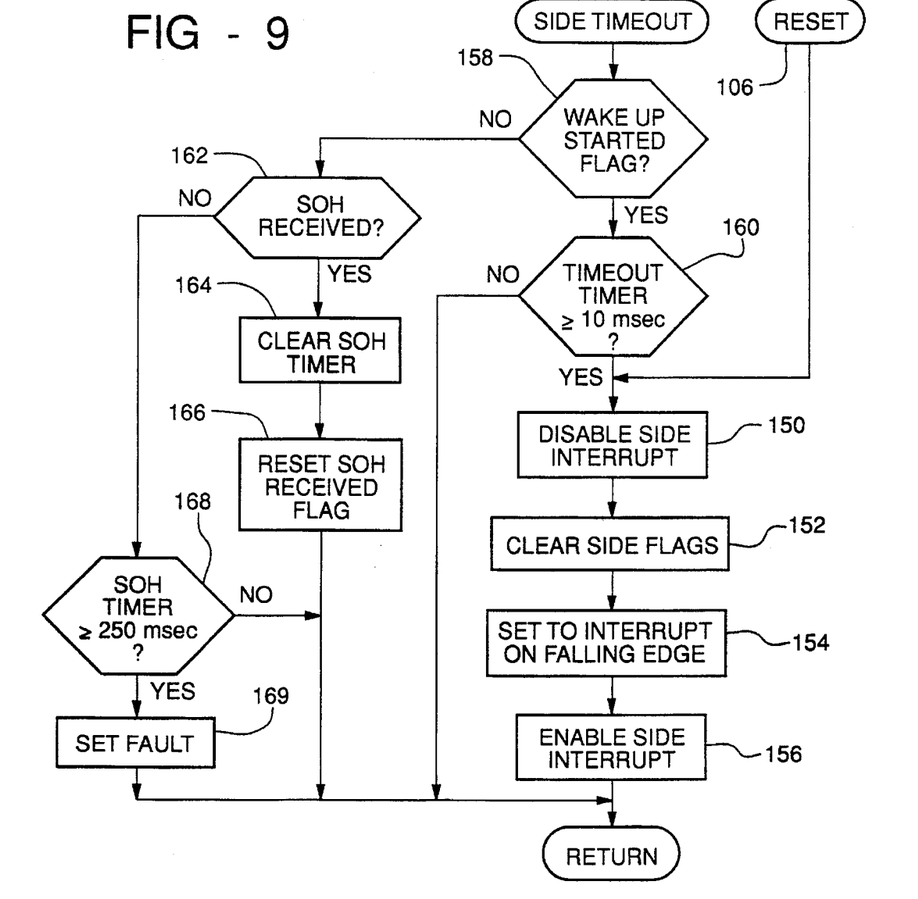

In the event that a pulse fails to be verified in the compare routine of FIG. 8, the reset and timeout routine of FIG. 9 is invoked. Upon entering the Reset 106 path the side interrupt is disabled <150>, the flags for the side algorithm are cleared <152>, the input capture is set to trigger on a falling edge <154> and the side interrupt is enabled <156> so that the system is in readiness to monitor the state of health signals and await the wake up pulse. The side timeout routine is invoked by the 5 msec interrupt in the power up routine. If the Wake Up Start flag is set <158> and the timeout timer exceeds 10 msec <160>, the reset occurs. If the timer has not timed out the routine is exited. This timeout assures that if a wake up pulse has started and has not been completed, the system will be reset, or if the wake up pulse has been completed and the deploy message pulses do not begin within the timer period, (as shown by the 10–15 msec period in FIG. 5) the system will be reset.

When the Wake Up Start flag is not set <158>, a 250 msec SOH timer is serviced. If a SOH Received flag has been set at block 76 <162> the SOH timer is cleared <164> and the SOH Received flag is reset <166>. When at block 162 the SOH Received flag has not been set, and the timer attains 250 msec <168> a fault message is issued <169>. This signals the telltale that the signals from the side sensor are for some reason not being received.

Figure 10:
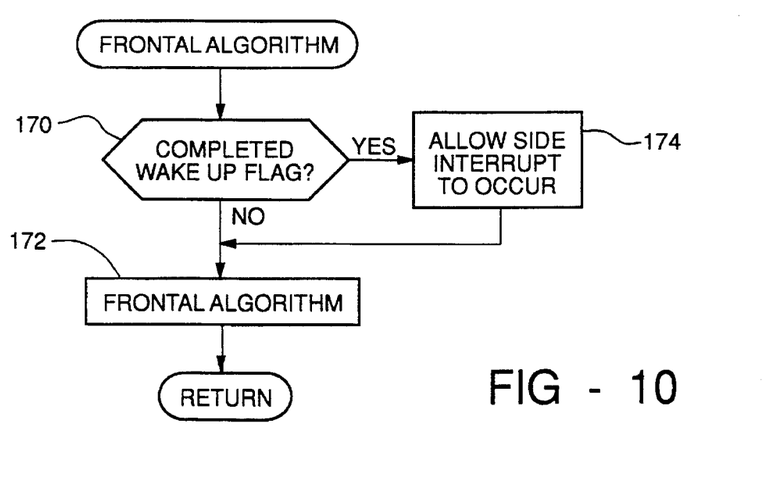

The frontal algorithm is periodically called by a timed interrupt. As shown in FIG. 10, it checks for the Completed Wake Up flag <170> and if the flag has not been set the frontal algorithm is processed <172> to analyze the frontal accelerometer signal and determine whether to deploy the frontal bags. Usually when a program is entered by an interrupt it will not be affected by a subsequent interrupt. Thus an input capture interrupt would not ordinarily take precedence over the frontal algorithm once it has started. Here it is provided that if the Completed Wake Up flag has been set <170> the microprocessor 16 is set to look for and respond to the side interrupt <174> so that the side deploy message signals will have priority over the frontal algorithm. This assures that the side air bag deployment can begin quickly, e.g., within 5–15 msec of a crash event. In the meantime, the frontal algorithm is retarded a small amount. In the case of frontal acceleration activity, the frontal algorithm may require about 400 μsec to run. If a side deploy message is sent at the same time, four input capture interrupts (defining three precision pulses) will occur to trigger the side algorithm which requires about 30 μsec each time it is called. Each time the side algorithm is completed the program returns to the frontal algorithm to continue from the point of interruption. Thus the four interrupts will add about 120 μsec to the frontal algorithm processing time.

It will thus be seen that the interface protocol presented here affords extremely reliable communication between a side sensor and the central controller. The combined wake up and deploy messages are short and simple and at the same time are not susceptible of being imitated by noise. Further, expensive high frequency data communication hardware is not needed to quickly communicate the deploy signals.

In this description and the following claims, the term "deploy signal" is a generic term inclusive of a wake up message and the ensuing deploy message.

The embodiments of the invention in which an exclusive property or privilege is claimed are defined as follows:

1. A supplemental inflatable restraint system having side and frontal air bags and corresponding side and frontal impact sensors, the system comprising:

a control for deploying the air bags;

a side impact sensor including means for generating a pulsed signal indicative of the sensor condition, and means for generating a deploy signal initiated upon an impending crash, the deploy signal having at least two successive accurately timed pulses of preset durations; and interface means for coupling the signals from the side impact sensor to the control;

the control including computer means for measuring the timed pulses and comparing the timed pulses to stored values of the preset durations to verify the deploy signal, and further including means for deploying a side air bag when a deploy signal is verified.

2. The invention as defined in claim 1 wherein the deploy signal comprises pulses alternating between a first state and a second state, and wherein:

the means for generating the deploy signal includes means for generating a first pulse at a first state for a first duration and a second pulse at a second state for a second duration.

3. The invention as defined in claim 1 wherein the deploy signal comprises pulses alternating between a first state and a second state, and wherein:

the computer means has an input capture register connected to the interface means for producing an interrupt at each state alteration of the deploy signal pulses and registering the time of each interrupt;

and the computer means includes means for calculating the intervals between successive interrupts from the registered interrupt times.

4. The invention as defined in claim 1 wherein:

the deploy signal comprises a wake up message followed by a deploy message;

the computer means has an input capture register connected to the interface means for producing interrupts at pulse edges of the deploy signal to process a side deploy algorithm;

the computer means includes a frontal algorithm to determine frontal air bag deployment, wherein the frontal algorithm is processed periodically and normally excludes response to the interrupts;

and means responsive to the wake up message for conditioning the computer means to respond to interrupts produced by the deploy message for processing the side deploy algorithm even during frontal algorithm processing.

5. The invention as defined in claim 1 wherein the means for generating a pulsed signal indicative of the sensor condition includes first driver means connected to the interface means for shaping pulse edges for minimizing radiated emission from the interface means; and the means for generating a deploy signal comprises second driver means for shaping the pulses for fast rise and fall rates whereby each pulse duration is clearly defined.

6. The invention as defined in claim 5 wherein the side impact sensor includes:

means for generating a mode signal having a first mode in the absence of an impending crash and a second mode when an impending crash is sensed; and means for coupling the mode signal to the first and second driver means for enabling the first driver means during the first mode and the second driver means during the second mode.

7. The invention as defined in claim 1 wherein the deploy signal comprises a first message for indicating an impending crash and a deploy message for commanding side air bag deployment.

8. The invention as defined in claim 1 wherein the side impact sensor includes a processor for outputting signal pulses indicative of an impending crash comprising a series of pulses of predetermined varying intervals.

9. The invention as defined in claim 1 wherein the deploy signal comprises a single extended pulse having a predetermined duration issued when crash conditions are likely, followed by a series of relatively short pulses of predetermined varying intervals when deployment is required.

10. A method of communication in a supplemental inflatable restraint system having frontal and side air bags and corresponding impact sensors, separate frontal and side processors for respective frontal and side sensors wherein a side processor determines when a side impact is impending and when a side air bag should be deployed, and actual deployment is controlled by the frontal processor, and a communication interface between the processors, said method of communication comprising the steps of:

determining when a side impact is impending and issuing a distinctive first pulsed signal over the communication interface to alert the frontal sensor to respond to ensuing pulses; and then determining when a side air bag should be deployed and issuing ensuing side deploy pulses over the communication interface to command the frontal processor to effect side air bag deployment.

11. The invention as defined in claim 10 including the step of:

processing a frontal deployment algorithm; and when said first pulsed signal has been issued, suspending processing of the frontal algorithm upon receipt of side deploy pulses to process a side algorithm for identifying a side deploy command.

12. The invention as defined in claim 10 wherein the ensuing pulses for commanding side air bag deployment comprise a distinctive series of high frequency variable duration pulses having a predetermined pattern of duration.

13. A method of deploying a side air bag in a supplemental inflatable restraint system having frontal and a side air bag, a frontal sensor for generating a frontal acceleration signal, a side sensor for generating a side acceleration signal, a side processor responsive to the side acceleration signal for issuing a deploy signal, a main processor responsive to the frontal acceleration signal for deployment of a frontal air bag and responsive to a deploy signal for deployment of a side air bag, and an interface between the side processor and the main processor, said method of deploying a side air bag comprising the steps of:

in the side processor, processing the side acceleration signal to detect an impending impact and generating a first message, then further processing the side acceleration signal to detect an impact and generating a deploy message, and communicating the first message and the deploy message to the main processor;

in the main processor, producing interrupts upon receipt of the deploy message from the side processor, processing the frontal acceleration signal to determine whether to deploy frontal air bags, upon receipt of the first message, conditioning the main processor to respond to the interrupts while processing the frontal acceleration signal, and then suspending processing of the frontal acceleration signal in response to a produced interrupt to determine whether a deploy message has been communicated; and deploying the side air bag when it is determined that a deploy message has been communicated.

14. The invention as defined in claim 13 wherein the deploy message includes a plurality of timed pulses, and the method of deploying a side air bag includes the steps of:

producing an interrupt at rising and falling edges of said timed pulses;

upon producing an interrupt, determining the time of interrupt occurrence and the time since a previous interrupt; and comparing the determined time with a preset value to verify receipt of a timed pulse.

15. The invention as defined in claim 13 wherein the deploy message includes a plurality of timed pulses, and the method of deploying a side air bag includes the steps of:

producing an interrupt at rising and falling edges of said timed pulses;

storing a plurality of values corresponding to preset pulse times for the timed pulses of the deploy message;

upon producing each interrupt, determining the time since a previous interrupt; and comparing the determined times to corresponding stored values to verify the deploy message.

* * * * *